(12) United States Patent
Liu (10) Patent No.: US 11,671,458 B1
(45) Date of Patent: *Jun. 6, 2023

(54) COHERENT METHOD OF CONSISTENCY FOR PURPOSE OF CLOUD AUTHORIZATION

(71) Applicant: Google LLC, Mountain View, CA (US)

(72) Inventor: Lei Liu, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/511,949

(22) Filed: Oct. 27, 2021

Related U.S. Application Data (63) Continuation of application No. 16/686,789, filed on Nov. 18, 2019, now Pat. No. 11,190,548.

(60) Provisional application No. 62/769,209, filed on Nov. 19, 2018.

(51) Int. Cl.
*H04L 9/40* (2022.01)
*H04L 67/1095* (2022.01)
*H04L 67/1097* (2022.01)

(52) U.S. Cl.
CPC ............ *H04L 63/20* (2013.01); *H04L 63/105* (2013.01); *H04L 67/1095* (2013.01); *H04L 67/1097* (2013.01)

(58) Field of Classification Search
CPC ... H04L 63/20; H04L 63/105; H04L 67/1095; H04L 67/1097
USPC ....................... 709/201, 217, 223, 232; 726/1
See application file for complete search history.

(56) References Cited

U.S. PATENT DOCUMENTS

| | | | | |
|---|---|---|---|---|
| 10,348,810 | B1* | 7/2019 | Florissi | H04L 67/1097 |
| 2005/0120095 | A1* | 6/2005 | Aman | H04L 67/1008 |
| | | | | 709/219 |
| 2006/0247051 | A1* | 11/2006 | Liu | A63F 13/332 |
| | | | | 463/40 |
| 2007/0049246 | A1* | 3/2007 | Schreter | G06F 9/465 |
| | | | | 455/406 |
| 2012/0188996 | A1* | 7/2012 | Roka | G06F 16/178 |
| | | | | 370/350 |
| 2012/0317621 | A1* | 12/2012 | Mihara | G06F 21/6218 |
| | | | | 726/4 |
| 2014/0161131 | A1* | 6/2014 | Yang | H04L 45/54 |
| | | | | 370/401 |
| 2014/0280952 | A1* | 9/2014 | Shear | H04L 47/70 |
| | | | | 709/226 |
| 2017/0046966 | A1* | 2/2017 | Velasquez | G09B 7/02 |
| 2017/0177687 | A1* | 6/2017 | Ritter | G06F 16/27 |

(Continued)

OTHER PUBLICATIONS

Jacob Lurie, Higher Topos Theory, Jul. 31, 2008, 735 pages.

(Continued)

*Primary Examiner* — Liang Che A Wang
(74) *Attorney, Agent, or Firm* — Lerner David LLP (57) ABSTRACT

The present disclosure sets up the foundation of consistency for cloud authorization. Consistency is formalized as univalence and a scheme of inductive types, and consistency pushouts and pullbacks are derived for cloud authorization. Induction schemas are developed for services, repositories and messages. The consistency is characterized as relative consistency, paraconsistency, and three levels of inconsistency. Due to duality of consistency, consistency recovery is constructed with a semantic model and synthetic retry message type families.

16 Claims, 5 Drawing Sheets

(56) References Cited

U.S. PATENT DOCUMENTS

| | | | |
|---|---|---|---|
| 2017/0272521 A1* | 9/2017 | Takahashi | H04W 4/08 |
| 2017/0331915 A1* | 11/2017 | Jann | G06F 9/451 |
| 2018/0349162 A1* | 12/2018 | Tian | G06F 9/45558 |
| 2019/0089595 A1* | 3/2019 | Kaplan Haelion | H04L 63/101 |
| 2019/0213275 A1* | 7/2019 | Shankar | G06F 16/252 |
| 2020/0042410 A1* | 2/2020 | Gupta | H04L 67/1097 |

OTHER PUBLICATIONS

Kuen-Bang Hou (Favonia), Higher-Dimensional Types in the Mechanization of Homotopy Theory, CMU-CS-17-101 Feb. 2017, 163 pages.

* cited by examiner

COHERENT METHOD OF CONSISTENCY FOR PURPOSE OF CLOUD AUTHORIZATION

CROSS-REFERENCE TO RELATED APPLICATIONS

This application is a continuation of U.S. patent application Ser. No. 16/686,789, filed on Nov. 18, 2019, which claims the benefit of the filing date of U.S. Provisional Patent Application No. 62/769,209, filed on Nov. 19, 2018, the disclosures of which are hereby incorporated herein by reference.

BACKGROUND

Cloud authorization faces the difficulties of consistency causing false authorization or denies. Characteristics of distributed computing, such as service availability, reliability, scalability, manageability, etc. reduce the strength of cloud authorization. Changes in services, resources, and actions, role updates, role assignment updates and deletions, deletions and purging of identities, reclassifications, and authorization migrations require homotopy-based authorizations. Failure updates, error retries, quota thresholds, service time of synchronous processing, queuing latency, and scheduled flume batch updates cause both false negative authentication (FNA) and false-positive denies (FPD). Weakness and errors of existing authorization rules, missing authorization rules, rule conflicts, and unknown authorization rules cause uncertainty of authorization.

BRIEF SUMMARY

The present disclosure proposes a novel solution to the problem of consistency, and sets up the foundation of consistency for cloud authorization. Consistency is formalizes as univalence and a scheme of inductive types, and consistency pushouts and pullbacks are derived for cloud authorization. Induction schemas are developed for services, repositories and messages. The consistency is characterized as relative consistency, paraconsistency, and three levels of inconsistency. Due to duality of consistency, consistency recovery is constructed with a semantic model and synthetic retry message type families. This solution develops an appropriate normalization procedure to show consistency.

One aspect of the disclosure provides a method for consistency in a distributed data store, including distributing jobs to various physical nodes for execution, listening, by one or more listener nodes, for a particular event, upon detecting the particular event, sending, by the listener node, an event message to a storage, reading, by a synch device, the message from storage, and processing, by the synch device, the message, wherein the processing comprises updating backend systems built upon the distributed data store. In some examples, the method may further include synchronizing the various physical nodes in parallel at a predetermined time, wherein the parallel synchronization is supported by shuffling, partitioning, and lazy operations. The event may be, for example, a write to the distributed data store, such as an update to an equivalence class of permissions to resources, the equivalence class having predefined access parameters. The storage may be, for example, a distributed queue. The method may further include acknowledging and removing the message from the storage after processing.

Another aspect of the disclosure provides a system for executing the method above.

DETAILED DESCRIPTION

Homotopic groups may be used in cloud authorization. For example, for a particular organizational structure, each resource and permission may have an identity and be bound to a particular group. The group may be represented by an algebraic structure. For example, each identity or resource may construct a point in the structure, where groups are represented by permissions and a path relation between two points. The paths may be determined by policies that set up the group bindings. According to some examples, the groups may be formed based on different levels of permissions. For example, resources in a first group may serve a first role, while resources in a second group serve a second role, etc. By way of example only, the roles may include a helpdesk administrator role, an email administrator role, a supervisory administrator role, a device administrator role, a general organization manager role, a common staff role, etc.

The groups may also include one or more rules, such as event-based rules, access-based rules, etc. As one possible example of an event-based rule, if a processor is delivering only 75% of packets successfully, the processor will be shut down or monitoring will be triggered. As one possible example of an access-based rule, only users in a managerial role can access a user profile.

In some instances, inconsistency in cloud authorization may arise. Just as one example, a particular user in an organization may have access to email that allows the user to read, send, save, delete, update, and perform other operations with respect to email. If a new policy is implemented, such as a policy prohibiting users from deleting email and instead automatically archiving the emails after a period of time, that policy may be implemented by an administrator on the cloud side. The update may be failed or delayed due to system contentions. It may take some time for the policy change to populate, and therefore the user may still be able to delete email during that time while systems on the backend are running the updated different policy. In addition, distributed transactions or atomic operations with the context of rollback results in local consistency but not global consistency. Replication shares information with consistency by redundancy. Distributed computing constructs coproduct types where consistency is not internally approvable. If we consider the type of everything, then it encodes a paradox. Even more, the strongly inaccessible resources in cloud is not provable. Consistency of large categories over cloud is not internally provable. Accordingly, inconsistencies may arise until the updated policy is fully populated.

The present disclosure provides for consistency in jobs running across a cloud environment. Induction of queue schema with retries construct infinite axioms to obtain global consistency. The asymptotic running-time computational complexity is at least doubly exponential. An algorithm may be defined to prove the consistency. The coherence method is to take the input as a comprehensive category and use local technique where the jobs are partitioned, for example, based on resource utilization and workload, and distributed to various physical nodes for execution. A parallel synchronization may be performed at any given time to ensure that each node within the cloud environment is consistent. For example, a lazy operation may be used to support such parallel synchronization. For example, an operation is performed by shuffling and partitioning data structures only upon read/write occurring within the system. In addition to the parallel synchronization at a given time, event-based synchronization is also performed. For example, a device in the cloud environment may serve as a listener for a particular event, such as a write to a cloud data store. Upon detecting such event, the listener device sends an event message to a reliable storage and continues listening for further events. The message is read from the reliable storage by another device serving as a synch device, which processes the message on the backend. For example, the synch device may update roles in a particular organization.

Figure 1:
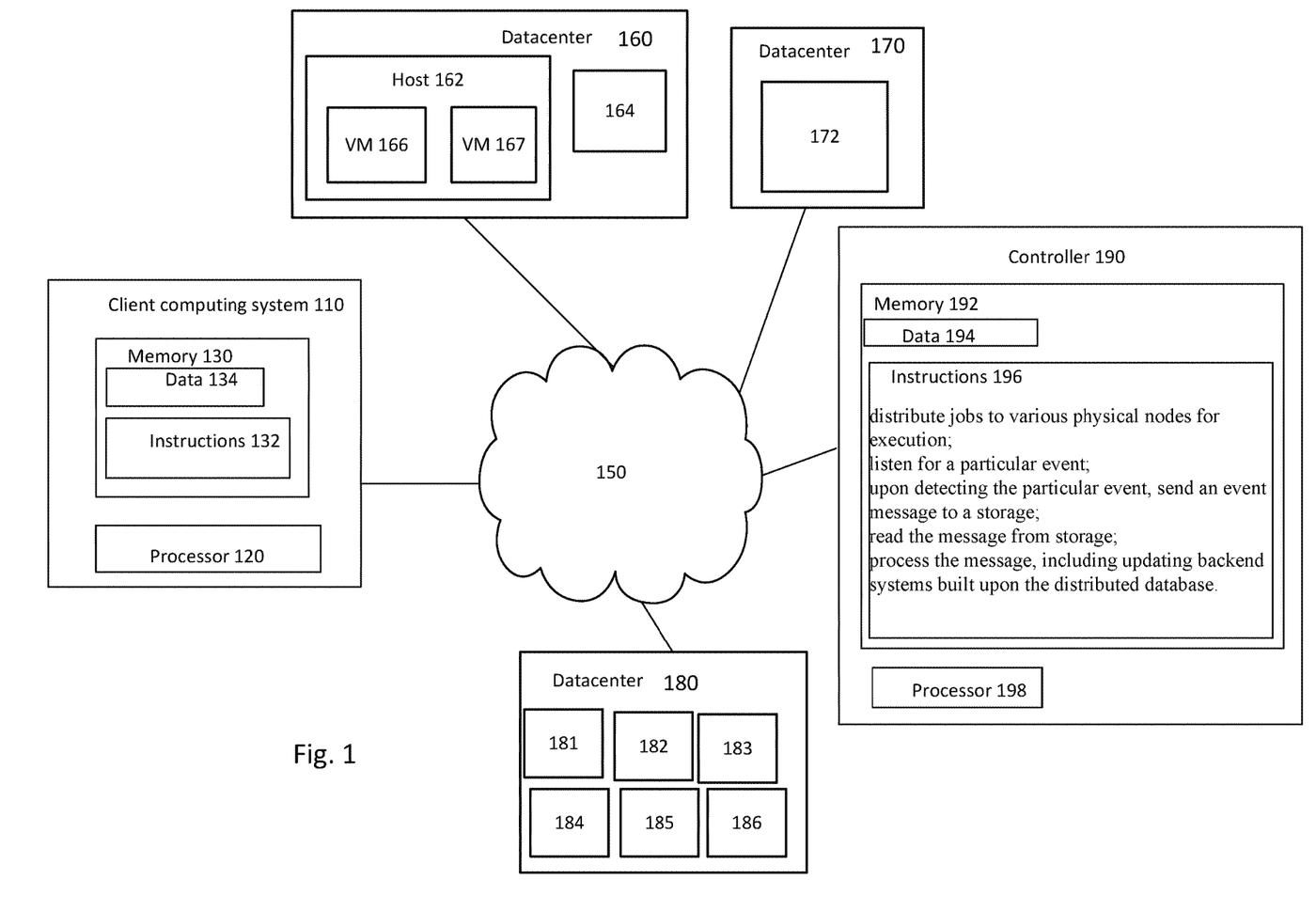
FIG. 1 is a block diagram of an example system within a distributed data store according to aspects of the disclosure.

FIG. 1 illustrates an example system including a distributed computing environment. A plurality of datacenters 160, 170, 180 may be communicatively coupled, for example, over a network 150. The datacenters 160, 170, 180 may further communicate with one or more client devices, such as client 110, over the network 150. Thus, for example, the client 110 may execute operations in "the cloud." In some examples, the datacenters 160, 170, 180 may further communicate with a controller 190.

Each client 110 may be a personal computer or a mobile device, intended for use by a person having all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by processor 120, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 110 may contain a processor 120, memory 130, and other components typically present in general purpose computers. The memory 130 can store information accessible by the processor 120, including instructions 132 that can be executed by the processor 120. Memory can also include data 134 that can be retrieved, manipulated or stored by the processor 120. The memory 130 may be a type of non-transitory computer readable medium capable of storing information accessible by the processor 120, such as a hard-drive, solid state drive, tape drive, optical storage, memory card, ROM, RAM, DVD, CD-ROM, write-capable, and read-only memories. The processor 120 can be a well-known processor or other lesser-known types of processors. Alternatively, the processor 120 can be a dedicated controller such as an ASIC.

The instructions 132 can be a set of instructions executed directly, such as machine code, or indirectly, such as scripts, by the processor 120. In this regard, the terms "instructions," "steps" and "programs" can be used interchangeably herein. The instructions 132 can be stored in object code format for direct processing by the processor 120, or other types of computer language including scripts or collections of independent source code modules that are interpreted on demand or compiled in advance.

The data 134 can be retrieved, stored or modified by the processor 120 in accordance with the instructions 132. For instance, although the system and method is not limited by a particular data structure, the data 134 can be stored in computer registers, in a data store as a structure having a plurality of different fields and records, or documents, or buffers. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that is used by a function to calculate relevant data.

Although FIG. 1 functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM and others within a read-only computer chip. Some or all of the instructions and data can be stored in a location physically remote from, yet still accessible by, the processor 120. Similarly, the processor 120 can actually include a collection of processors, which may or may not operate in parallel.

The datacenters 160-180 may be positioned a considerable distance from one another. For example, the datacenters may be positioned in various countries around the world. Each datacenter 160, 170, 180 may include one or more computing devices, such as processors, servers, shards, or the like. For example, as shown in FIG. 1, datacenter 160 includes computing devices 162, 164, datacenter 170 includes computing device 172, and datacenter 180 includes computing devices 181-186. According to some examples, the computing devices may include one or more virtual machines running on a host machine. For example, computing device 162 may be a host machine, supporting a plurality of virtual machines 166, 167 running an operating system and applications. While only a few virtual machines 166, 167 are illustrated in FIG. 1, it should be understood that any number of virtual machines may be supported by any number of host computing devices. Moreover, it should be understood that the configuration illustrated in FIG. 1 is merely an example, and that the computing devices in each of the example datacenters 160-180 may have various structures and components that may be the same or different from one another.

Programs may be executed across these computing devices, for example, such that some operations are executed by one or more computing devices of a first datacenter while other operations are performed by one or more computing devices of a second datacenter. In some examples, the computing devices in the various datacenters may have different capacities. For example, the different computing devices may have different processing speeds, workloads, etc. While only a few of these computing devices are shown, it should be understood that each datacenter 160, 170, 180 may include any number of computing devices, and that the number of computing devices in a first datacenter may differ from a number of computing devices in a second datacenter. Moreover, it should be understood that the number of computing devices in each datacenter 160-180 may vary over time, for example, as hardware is removed, replaced, upgraded, or expanded.

Moreover, various backend systems may be built upon the distributed data store. For example, identity management systems, domain name server (DNS) setting management systems, etc. Such backend systems may to some extent be interrelated. For example, a user of the DNS setting management system may log in using an identification managed by the identity management system. In this regard, authorization parameters providing for access to such backend systems should be consistent. Accordingly, updates impacting access to one backend system, or to another part of the distributed data store, should be efficiently permeated to interrelated backend systems, thereby ensuring that authorization parameters are consistent.

In some examples, each datacenter 160-180 may also include a number of storage devices (not shown), such as hard drives, random access memory, disks, disk arrays, tape drives, or any other types of storage devices. The datacenters 160-180 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The datacenters may include a number of other devices in addition to the storage devices, such as cabling, routers, etc. Further, in some examples the datacenters 160-180 may be virtualized environments. Further, while only a few datacenters 160-180 are shown, numerous datacenters may be coupled over the network 150 and/or additional networks.

In some examples, the controller 190 may communicate with the computing devices in the datacenters 160-180, and may facilitate the execution of programs. For example, the controller 190 may track the capacity, status, workload, or other information of each computing device, and use such information to assign tasks. The controller 190 may include a processor 198 and memory 192, including data 194 and instructions 196, similar to the client 110 described above. The controller 190 may be configured to maintain consistency of authorization parameters throughout the distributed data store. For example, maintaining consistency may include listening for a particular event by a listener device, which sends a message to storage upon detecting the particular event. A synch device may read the message for storage, and process the message, including updating the backend systems built upon the distributed data store. The listener device and the synch device may be the same device or different device. The controller 190, for example, may serve as either or both of the listener device and the synch device. According to other examples, other nodes of the network serve as one or both of the listener and synch devices. By way of example only, a plurality of nodes, such as one in each datacenter 160-180, may be designated as listener devices. Further to this example, the controller 190 may serve as the synch device, processing authorization updates to each of the backend systems.

Client 110, datacenters 160-180, and controller 190 can be capable of direct and indirect communication such as over network 150. For example, using an Internet socket, a client 110 can connect to a service operating on remote servers through an Internet protocol suite. Servers can set up listening sockets that may accept an initiating connection for sending and receiving information. The network 150, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing. Such communication may be facilitated by a device capable of transmitting data to and from other computers, such as modems (e.g., dial-up, cable or fiber optic) and wireless interfaces.

Client 110 may request access to a program utilizing on of the backend systems in the cloud, or may request an update to access parameters. Such request may be handled by the controller 190 and/or one or more of the computing devices in datacenters 160-180. By way of example only, a request to update access parameters may be received by host computing device 162. In response, computing device 162 commits a write to the data store and also submits a write to a particular queue in the data store. The controller 190 may retrieve the information from the particular queue, and use such information to update the backend systems, removing the information from the queue when the update is successfully completed.

Distributed data store and backend systems built upon such data stores may implement induction schemas or manifest files for internal consistency. For example, backend systems such as identity management systems, authorization systems, systems for managing DNS settings, etc. may implement induction schemas or manifest files. Cloud authorization typically implements induction queue schemas with error retries for global consistency.

According to one aspect of the disclosure, cloud authorization may be implemented as a first-order theory of the natural numbers with the addition operation and equality, omitting the multiplication operation entirely. The axioms include a first-order axiom schema. For example, cloud authorization does an axiom schema of induction, representing infinitely many axioms. Since the axioms in the schema cannot be replaced by any finite number of axioms, cloud authorization is not finitely axiomatizable in first-order logic.

Figure 2:
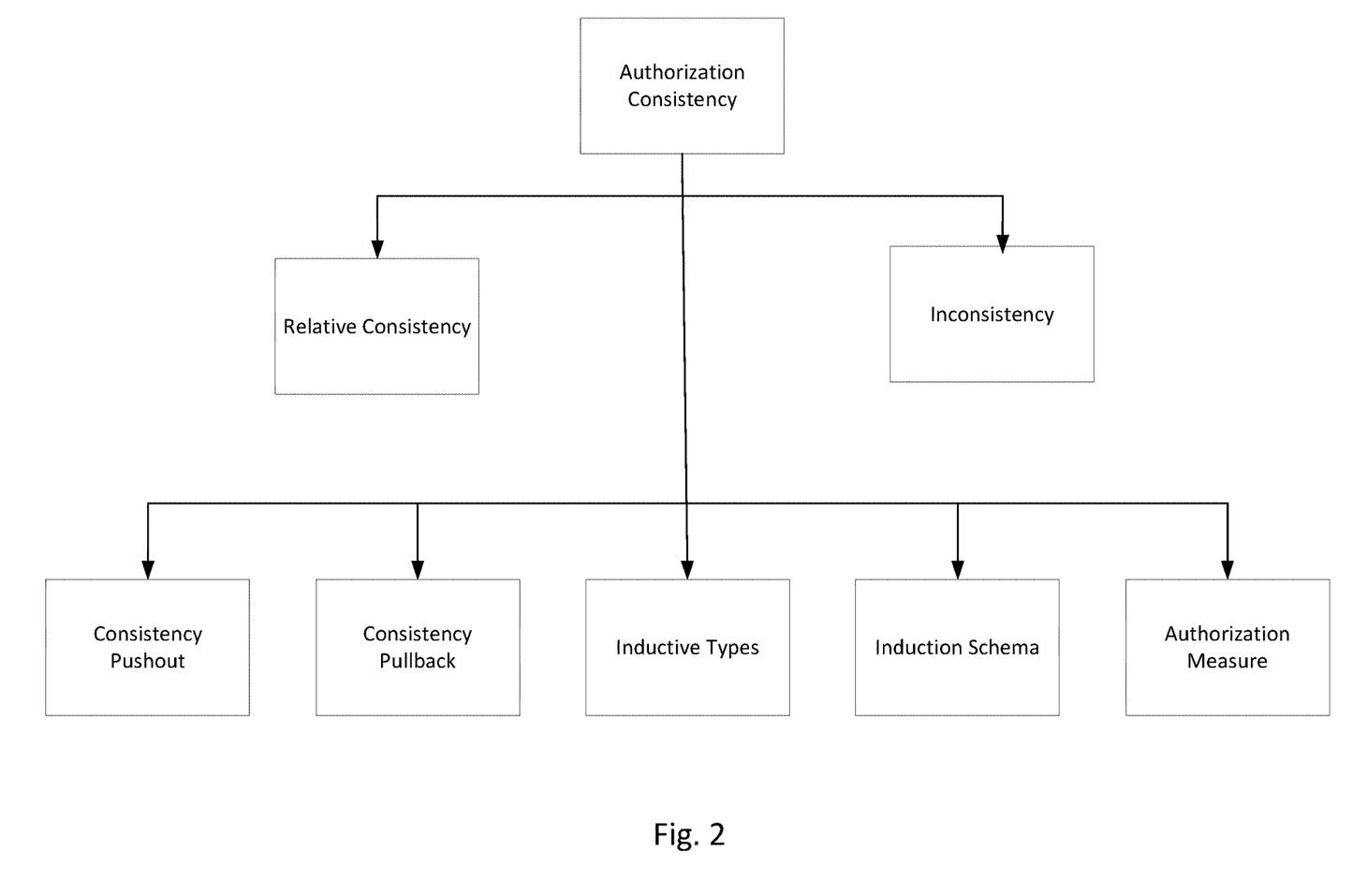
FIG. 2 is a block diagram of an example framework for consistency in a distributed data store according to aspects of the disclosure.

FIG. 2 illustrates a framework for consistency in cloud authorization. Consistency of cloud authorization is encoded as relative consistency and inconsistency. With respect to relative consistency, if T is a theory and A is an additional axiom, T+A is said to be consistent relative to T. Accordingly, if it can be proved that if T is consistent, then T+A is consistent. If both A and A are consistent with T, then A is independent of T.

With respect to inconsistency, an axiom is called inconsistent or to lead to an inconsistency if adding it to an ambient logical system makes that system inconsistent. For cloud authorization, the consistency of univalence means that in cloud, without univalence, one cannot define any predicate that provably distinguishes isomorphic types; thus isomorphic types are externally indiscernible, and univalence incarnates that principle internally by making them identical.

According to one example implementation, a universe of cloud authorization is a type whose elements are types. A hierarchy of universes U0:U1:U2 . . . is implemented, where every universe Ui is an element of the next universe Ui+1. The universes are cumulative, such that all the elements of the ith universe are also elements of the (i+1)st universe. For example, if A:Ui then also A:Ui+1. This is convenient, but has the consequence that elements no longer have unique types.

Consistency is constructed for cloud authorization based on univalence. For any A;B: U, univalence is the identification of A=U B with the type (A≈B) of equivalences from A to B. In particular, it is an equivalence (A=U B)≈(A≈B). Cloud authorization has the familiar fact in category theory that if two objects have the same universal property, then they are equivalent. Inductive types actually do have a universal property. With the equivalence relations, cloud authorization has consistency with repeatable authorization.

Given two functions f1: A→B1 and f2: A→B2, the pushout is a type D inductively generated by maps v1: B1→D and v2: B2→D and a homotopy μ, where:

$$\mu:\Pi_{x:A}Id_D(v_1(f_1(x)),v_2(f_2(x)))$$

Pushout is a non-recursive higher inductive type to construct consistency for cloud authorization. For example, other finite homotopy colimits, and also some infinite homotopy colimits, can be constructed using the natural numbers type.

Figure 3:
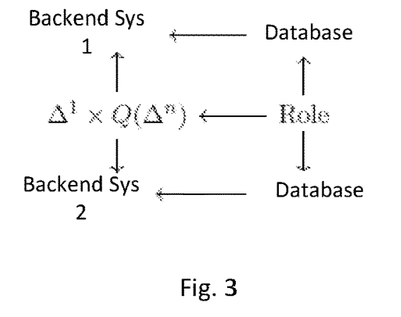
FIG. 3 is a vector diagram illustrating an example of role pushout for consistency in a distributed data store according to aspects of the disclosure.

Higher inductive pushouts are a type constructor whose consistency can be provable. For example:

Dimension 3 pushouts construct consistency with the backend systems. By way of example, FIG. 3 illustrates an example role pushout to the distributed data store, which pushes out the update to the backend systems. This is further discussed in connection with FIG. 4 below.

Pullback may be represented by a coherence method for cloud authorization, where the input is taken as a comprehension category and a local universes technique is used. The left adjoint splitting admits strictly stable structure obtained by constructing weakly stable structure once in the universal case.

A consistent system may have strictly stable identity types, strictly stable dependent identity types, strictly stable identity applications, and strictly stable typal pushouts. As a result, cloud authorization may be weakly stable under reindexing morphisms of types and good identity types.

For the collection of finite dimensional distribution over cloud, one can assume a probability space. Hence, there exists a measure for cloud authorization. For example, specifying the finite dimensional distribution to be the Gaussian random variables, a probability space matching the purpose can always be identified. The used function for Bayesian estimation is the mean square error. Inconsistency constructs a topological space, a measurable space, and metric space. In addition, consistency strength is the instances of inconsistency, duration of inconsistency, and frequency of the inconsistency. Duality of strength is times of retries, duration of retries, frequency of retries, and consistency ratio. The homotopic measure is the delay of average agreement and consistency. There are statistics, estimator, test, and sparsistency metrics constructed for measure consistency.

Figure 4:
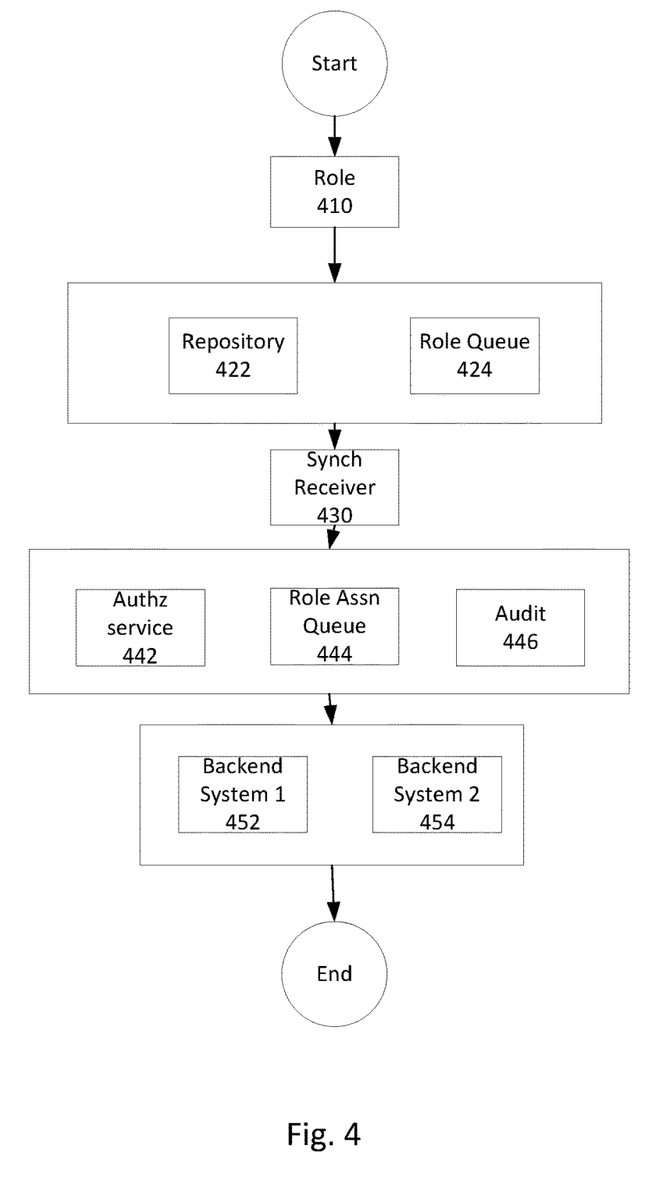
FIG. 4 is a flow diagram illustrating an example of role pushout for consistency in a distributed data store according to aspects of the disclosure.

FIG. 4 illustrates an example of role pushout for cloud authorization consistency. According to this example, writes changing a particular role 410 are made to the distributed data store and a distributed queue in the same transaction. For example, a write to the repository 422 is performed, and once that write is done, a single message with bits set to one or more targeted backend systems may be sent to role queue 424. A synch receiver 430 reads the messages from the role queue 424 asynchronously. The synch receiver 430 picks up a message and processes it on targeted backend systems 452, 454. Once processing is done, the backend systems 452, 454 acknowledge the message. The acknowledgement will remove the message from the role queue 424. This journaling pattern helps to track the backend systems 452, 454 which are yet to be updated in case of failures.

According to some examples, updates to the backend systems 452, 2454 will create messages for all affected assignments in role assignment queue 444 targeted to the backend system. For example, the backend system may be an identity management system. A role update message may be sent to all affected role assignments in the role queue 424. In some examples, however, creating or deleting a role may not affect the backend system. After the fanout of the role assignment changes, authorization service compute the permission based upon the lattice of privileges to grant or deny the service access. Audit service records the write/update/deletion of roles and role assignments.

Figure 5:
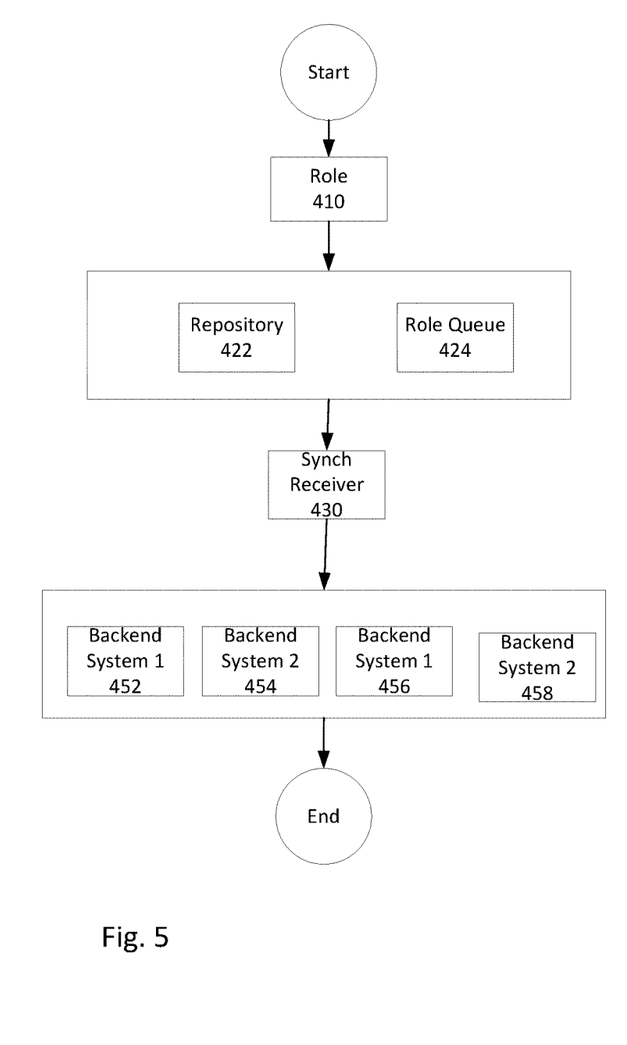
FIG. 5 is a flow diagram illustrating another example of role pushout for consistency in a distributed data store according to aspects of the disclosure.

FIG. 5 illustrates another example of role assignment pushout for cloud authorization consistency. According to this example, writes to the distributed data store and to a queue of the distributed data store are again performed in the same pushout context. Once the write to the distributed data store is done, a message with bits set for the targeted backend systems is sent to the role assignment queue. The message may be sent to the queue with some scheduled delay. For example, the delay may be several seconds, a minute, or longer, thereby providing enough time for writes to the backend systems to complete. In some examples, such as where the backend system includes an identity management system, the backend system may be updated for supervisory administrative role assignments to avoid queue delay. In this regard, a customer may check for a successful return code. If successful, the message may be removed and replaced with a new message without a bit for the backend. If unsuccessful, the queued message may be picked up by the synch receiver 430 for the backend system to update. Updates to other backend systems may be performed, for example, using synchronous compilation, and checking for a return code. For a successful return code, the message may be removed and replaced with a message without a backend bit. For an unsuccessful return code, the queued message may be picked up by the synch receiver 430 for the backend system update. The synch receiver 430 picks up the message for the targeted backend system. This helps to track the target which are yet to be processed in case of failures, and once done, acknowledge the message. All backend systems may be updated, and the acknowledgement will remove the message from queue.

Figure 6:
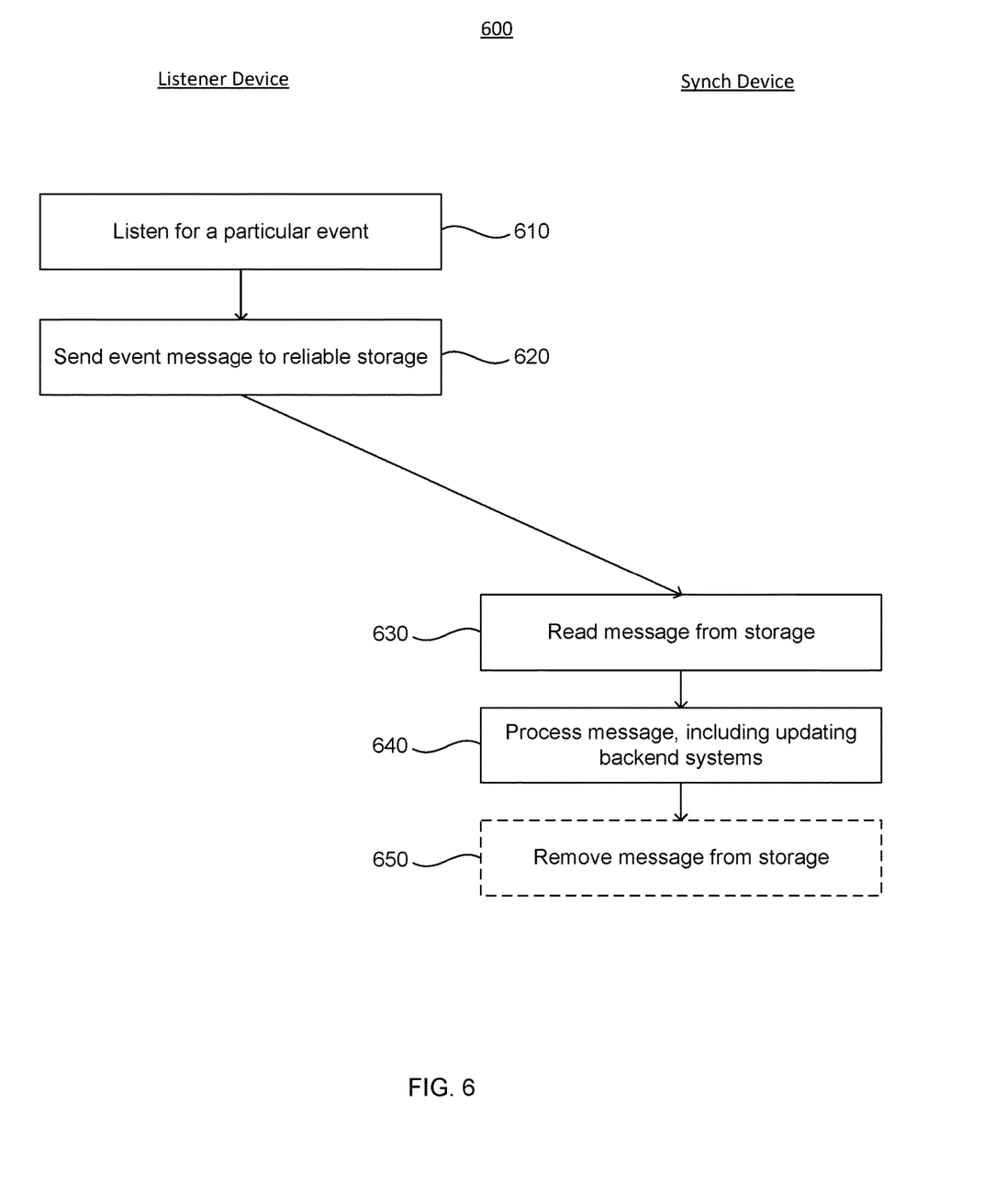
FIG. 6 is a flow diagram illustrating a method according to aspects of the disclosure.

FIG. 6 illustrates a method 600 of maintaining consistency for cloud authorization. It should be understood that the following operations do not have to be performed in the precise order described below. Rather, various steps can be handled in a different order or simultaneously, and steps may also be added or omitted.

Block 610 provides for listening, by a listener device, for a particular event. For example, the event may be a write to the distributed data store. By way of example, the write may involve a change to access parameters for one or more backend systems built on top of the distributed data store. According to some examples, a plurality of listener devices may listen for events at the same time.

In block 620, the listener device sends an event message to a storage, such as a specific queue in the distributed data store for access parameter updates. Event message encodes the sources and targets of backend systems and journal of payload information as buffers. The listener device may continue listening for further events during and/or after sending the message to storage.

In block 630, a synch device reads the message from storage. For example, the synch device may be configured to check the specific queue periodically, or to detect when new information is entered into the queue. The synch device may be a different device than the listener device, located in a same location or a remote location.

In block 640, the synch device may process the message, including updating the backend systems. For example, the message encodes the sources, targets, operation types, and journal pattern information regarding the backend updates. The messages are buffered binary bits. The message is decoded as binary. The message processing is partitioned with equivalence relations of roles and policy bindings. The corresponding listeners receive the messages and update a backend system with verification and guarantee. The synch device may push out updates to a number of the backend systems.

In block 650, the synch device may optionally remove the message from the storage. For example, if the updates are completed successfully, the synch device may remove the message from the specific queue, indicating that no further action is needed with respect to that particular event.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for consistency in a distributed data store, comprising:
   listening, by a listener component, for a particular event associated with updating predefined access parameters for a role in an organization;
   upon detecting the particular event, sending, by the listener component, an event message to a storage;
   reading, by a synch component, the event message from the storage;
   processing, by the synch component, the event message, wherein the processing comprises updating backend systems built upon the distributed data store; and
   removing, by the synch component, the event message from the storage after the processing;
   wherein the listener component and the synch component are located on the same device.

2. The method of claim 1, wherein the device is a controller that communicates with the backend systems.

3. The method of claim 1, wherein jobs are distributed to physical nodes for execution in the distributed data store, and wherein the physical nodes are synchronized in parallel using lazy operations.

4. The method of claim 1, wherein the particular event is a write to the distributed data store.

5. The method of claim 1, further comprising generating, in response to updating the backend systems, a message for all affected assignments in a role assignment queue.

6. The method of claim 1, wherein the storage comprises a data store queue.

7. The method of claim 1, wherein updating the backend systems comprises updating authorizations impacting access to the backend systems.

8. A system for consistency in a distributed data store, comprising:
   a listener component comprising one or more processors configured to:
     listen for a particular event associated with updating predefined access parameters for a role in an organization; and
     upon detecting the particular event, send an event message to a storage; and
   a synch component comprising one or more processors configured to:
     read the event message from the storage;
     process the event message, wherein the processing comprises updating backend systems built upon the distributed data store; and
     remove the event message from the storage after the processing;
   wherein the listener component and the synch component are located on the same device.

9. The system of claim 8, wherein the device is a controller that communicates with the backend systems.

10. The system of claim 8, wherein jobs are distributed to physical nodes for execution in the distributed data store, and wherein the physical nodes are synchronized in parallel using lazy operations.

11. The system of claim 8, wherein the particular event is a write to the distributed data store.

12. The system of claim 8, wherein the synch component is further configured to generate, in response to updating the backend systems, a message for all affected assignments in a role assignment queue.

13. The system of claim 8, wherein the storage comprises a data store queue.

14. The system of claim 8, wherein updating the backend systems comprises updating authorizations impacting access to the backend systems.

15. A non-transitory computer-readable medium storing instructions executable by one or more processors for consistency in a distributed data store, the instructions comprising:
   listening, by a listener component, for a particular event associated with updating predefined access parameters for a role in an organization;

upon detecting the particular event, sending, by the listener component, an event message to a storage;

reading, by a synch component, the event message from the storage;

processing, by the synch component, the event message, wherein the processing comprises updating backend systems built upon the distributed data store; and removing the event message from the storage after the processing;

wherein the listener component and the synch component are located on the same device.

16. The computer-readable medium of claim 15, wherein updating the backend systems comprises updating authorizations impacting access to the backend systems.

\* \* \* \* \*